(12) United States Patent
Runde

(10) Patent No.: US 7,914,080 B2
(45) Date of Patent: Mar. 29, 2011

(54) HEAD RESTRAINT GUIDE WITH TWO-WAY LOCKING LEVER

(75) Inventor: David M. Runde, Beverly Hills, MI (US)

(73) Assignee: Intier Automotive Inc., Newmarket (CA)

( * ) Notice: Subject to any disclaimer, the term of this patent is extended or adjusted under 35 U.S.C. 154(b) by 373 days.

(21) Appl. No.: 12/330,584

(22) Filed: Dec. 9, 2008

(65) Prior Publication Data

US 2009/0184557 A1 Jul. 23, 2009

Related U.S. Application Data

(60) Provisional application No. 61/022,866, filed on Jan. 23, 2008.

(51) Int. Cl.
*A47C 7/38* (2006.01)
(52) U.S. Cl. .................................... 297/410; 297/463.1
(58) Field of Classification Search ................. 297/410, 297/463.1, 463.2
See application file for complete search history.

(56) References Cited

U.S. PATENT DOCUMENTS

| | | | |
|---|---|---|---|
| 4,545,618 A * | 10/1985 | Kitamura | 297/410 |
| 5,156,440 A * | 10/1992 | Vidwans | 297/410 |
| 5,529,379 A * | 6/1996 | Stocker | 297/410 |
| 5,860,703 A | 1/1999 | Courtois et al. | |
| 5,934,755 A | 8/1999 | Halamish | |
| 6,742,846 B1 | 6/2004 | Isaacson | |
| 7,044,556 B1 | 5/2006 | Yetukuri et al. | |
| 7,121,626 B2 | 10/2006 | Akehi et al. | |
| 7,159,946 B2 | 1/2007 | Gurtatowski et al. | |
| 7,172,255 B2 | 2/2007 | Wanke | |
| 7,669,933 B2 * | 3/2010 | Watanabe | 297/410 |
| 2005/0280305 A1 | 12/2005 | Gurtatowski et al. | |
| 2006/0214492 A1 | 9/2006 | Hassler et al. | |
| 2008/0001456 A1 | 1/2008 | Muller et al. | |

* cited by examiner

*Primary Examiner* — Anthony D Barfield
(74) *Attorney, Agent, or Firm* — Clark Hill, PLC; Robin Asher

(57) ABSTRACT

A head restraint guide for guiding and engaging an armature of a head restraint includes a guide bushing having an axial bore for receiving the armature therein. A lever is pivotally coupled within the guide bushing and includes an aperture for receiving the armature therethrough. A spring includes first and second portions biased against the armature. The first portion is adapted for engaging any of a plurality of adjustment notches on a first side of the armature. The second portion is adapted for engaging a stop notch on a second side of the armature. Pivoting the lever in a first direction disengages the first portion of the spring from the plurality of adjustment notches and allows axial adjustment of the armature. Pivoting the lever in a second direction disengages the second portion of the spring from the stop notch and allows removal of the armature from the guide bushing.

19 Claims, 6 Drawing Sheets

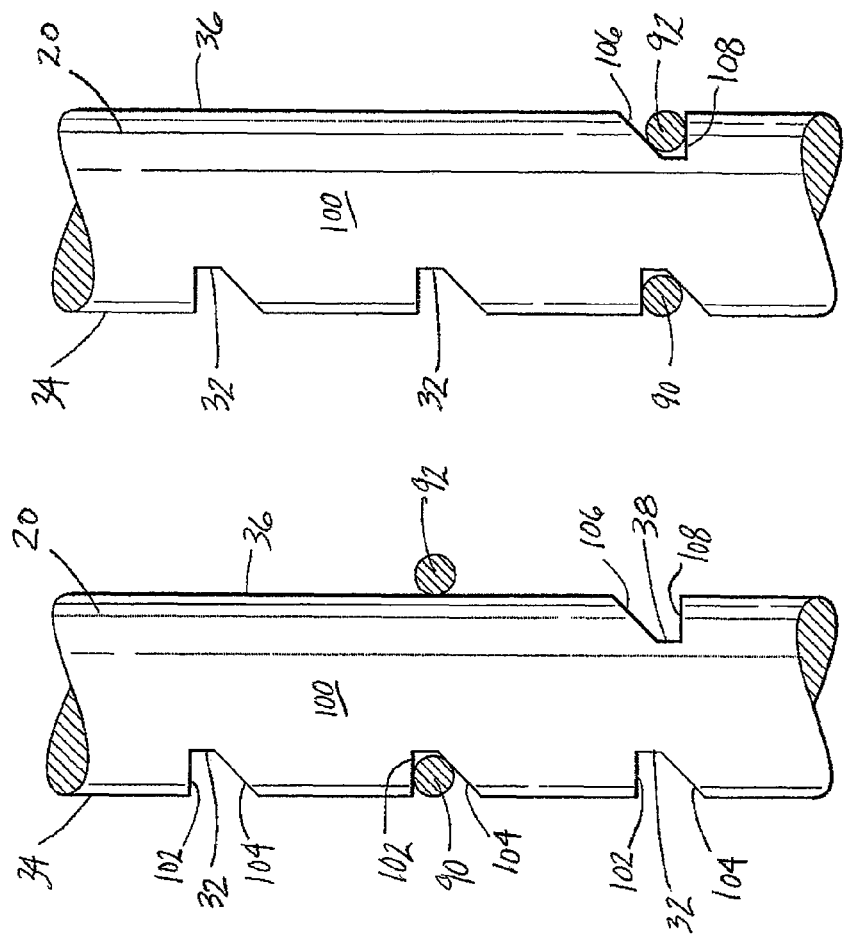
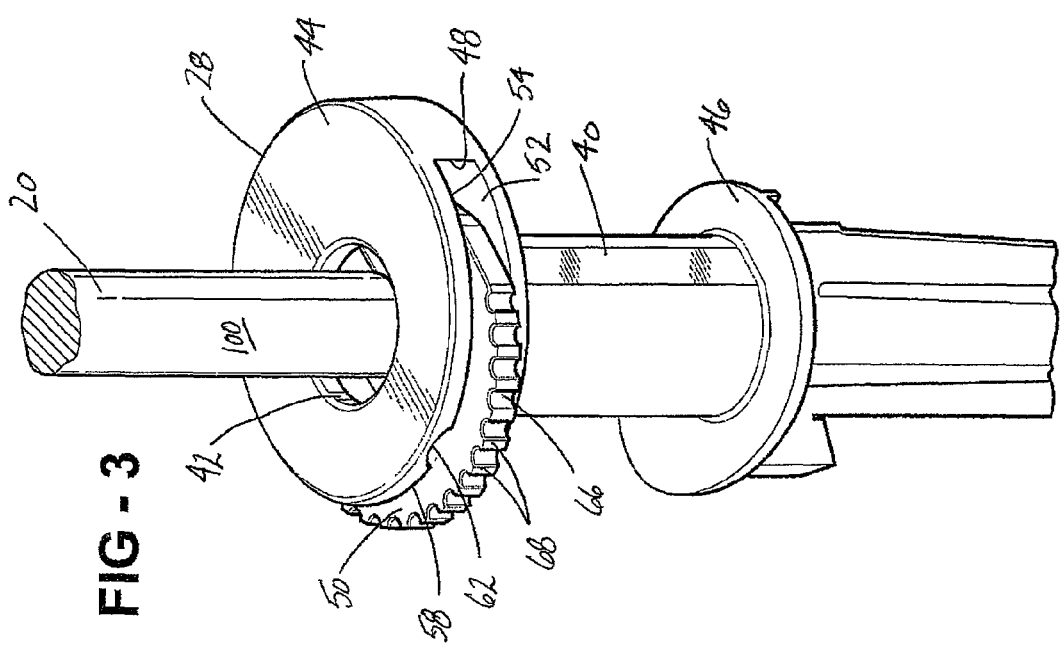

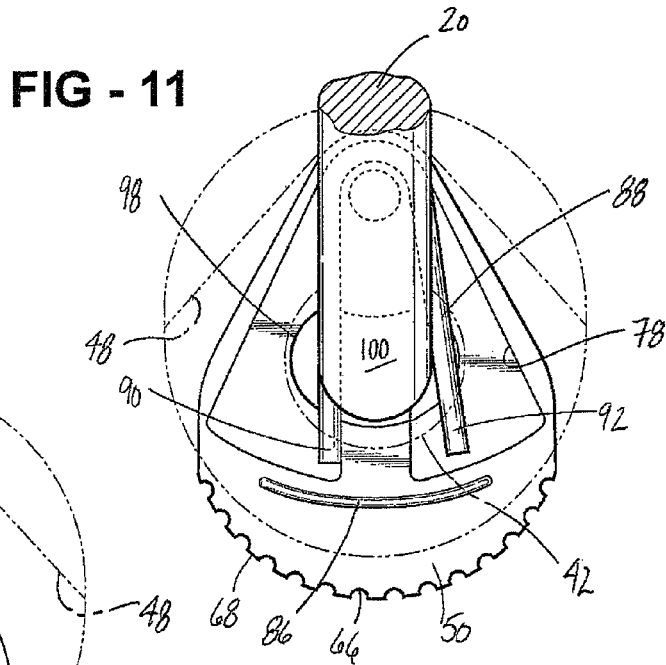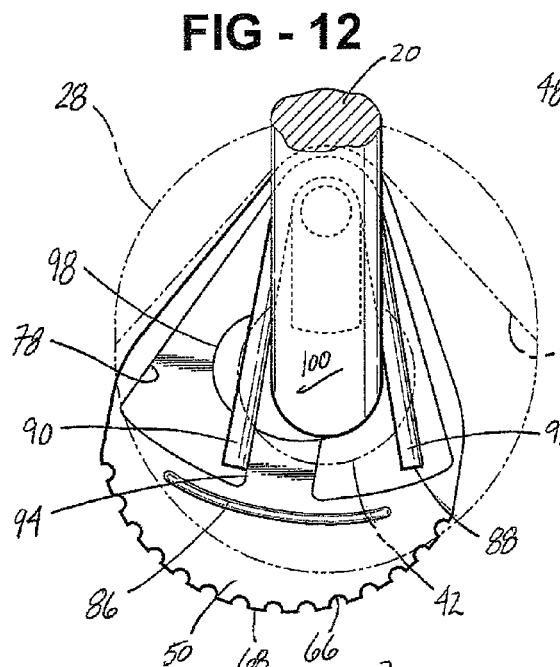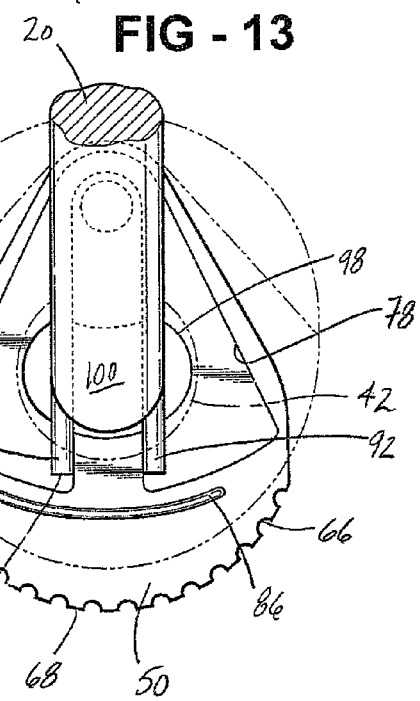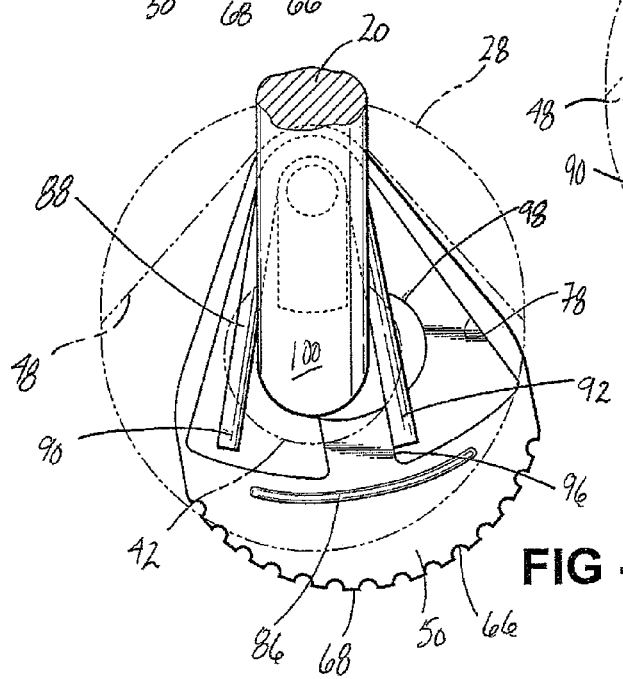

HEAD RESTRAINT GUIDE WITH TWO-WAY LOCKING LEVER

CROSS-REFERENCE TO RELATED APPLICATION

This application claims priority to and all the benefits of U.S. Provisional Application No. 61/022,866, filed on Jan. 23, 2008 and entitled "Head Restraint Guide With Two-Way Locking Lever."

BACKGROUND OF THE INVENTION

1. Field of the Invention

The invention relates to an adjustable head restraint of an automotive vehicle seat. More particularly, the invention relates to a head restraint guide having a two-way locking lever.

2. Description of Related Art

Adjustable head restraints are well known in the automotive vehicle seating art. Typically, adjustable head restraints include at least one armature or rod extending vertically downward for attaching the head restraint to an upper end of a seat back. The seat back includes a frame with an attachment tube or opening for receiving a plastic guide bushing or sleeve therein. The guide bushing is inserted into the attachment tube or opening and slidably guides the armature during vertical height adjustment of the head restraint.

Various guide bushings are well known in the seating art that allow for vertical height adjustment of the head restraint and also allow for complete removal of the head restraint from the seat back. Typically, for use with such a guide bushing, the armature includes a series of vertically spaced apart adjustment notches along one side and a stop notch on the other side formed adjacent to or below the lowest adjustment notch. The guide bushing includes a first locking element for engagement with one of the series of adjustment notches, thereby locking the armature and head restraint in place. A first button or release mechanism is actuated to disengage the first locking element from the respective adjustment notch to allow the armature to slide within the guide bushing, thus permitting vertical height adjustment of the head restraint.

The guide bushing also includes a second locking element for engagement with the stop notch which prevents the armature from being completely removed from the guide bushing when the head restraint is lifted upwards. A second button or release mechanism is actuated to disengage the second locking element from the stop notch to allow removal of the armature from the guide bushing, thus permitting complete removal of the head restraint from the seat back.

While such guide bushings are well known and provide the desired functionality, the necessity of having separate locking elements and release mechanisms for vertical height adjustment and removal of the head restraint adds cost and complexity to the system. It is therefore desirable to provide a simple and robust two-way locking lever that controls vertical height adjustment of a head restraint and also controls removal of the head restraint from a seat back.

SUMMARY OF THE INVENTION

According to one aspect of the invention, a head restraint guide is provided for guiding and engaging an armature of a head restraint. The armature includes a plurality of adjustment notches on a first side and a stop notch on a second side. The head restraint guide includes a guide bushing having an axial bore for receiving the armature therein. A lever is pivotally coupled to the guide bushing. A spring includes first and second portions biased against the armature. The first portion of the spring is adapted for engaging any of the plurality of adjustment notches and the second portion of the spring is adapted for engaging the stop notch. Pivoting the lever in a first direction disengages the first portion of the spring from the plurality of adjustment notches allowing axial adjustment of the armature relative to the guide bushing and pivoting the lever in a second direction disengages the second portion of the spring from the stop notch allowing removal of the armature from the guide bushing.

According to another aspect of the invention, an automotive vehicle seat includes a seat back and a head restraint operatively coupled thereto. The head restraint includes an armature having a plurality of adjustment notches on a first side and a stop notch on a second side. A guide bushing is coupled to the seat back and includes an axial bore for receiving the armature therein. A two-way locking lever is pivotally coupled to the guide bushing and includes an aperture for receiving the armature therethrough. A spring includes first and second portions biased against the armature. The first portion is adapted for engaging any one of the plurality of adjustment notches to lock the head restraint in place and the second portion is adapted for engaging the stop notch to prevent removal of the head restraint from the seat back. Actuating the lever in a first direction disengages the first portion from the plurality of adjustment notches to allow axial adjustment of the head restraint relative to the seat back. Actuating the lever in a second direction disengages the second portion from the stop notch to allow removal of the head restraint from the seat back.

BRIEF DESCRIPTION OF THE DRAWINGS

Advantages of the present invention will be readily appreciated as the same becomes better understood by reference to the following detailed description when considered in connection with the accompanying drawings wherein:

FIG. 3 is an enlarged, perspective view of one of the head restraint guide bushings and the armature;

FIG. 4 is a fragmentary, side view of the armature in a first adjusted position;

FIG. 5 is a fragmentary, side view of the armature in a second adjusted position;

FIG. 11 is a fragmentary, perspective view of the armature with the two-way locking lever in a first locking position;

FIG. 12 is a fragmentary, perspective view of the armature with the two-way locking lever in an adjustment position;

FIG. 13 is a fragmentary, perspective view of the armature with the two-way locking lever in a second locking position; and FIG. 14 is a fragmentary, perspective view of the armature with the two-way locking lever in a removal position.

DETAILED DESCRIPTION OF THE EMBODIMENTS

Figure 1:
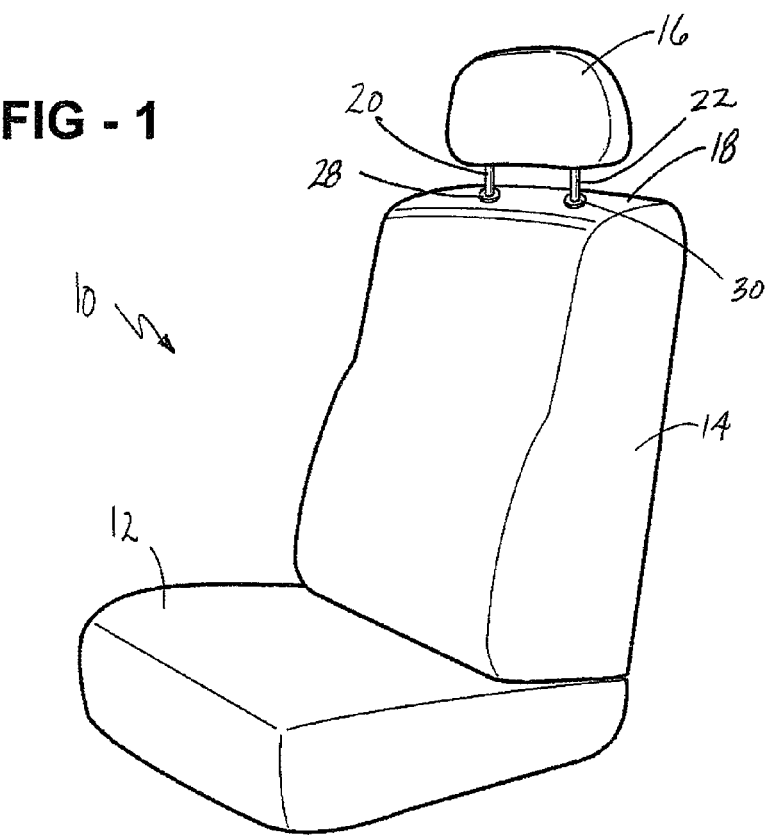
FIG. 1 is a perspective view of an automotive vehicle seat including a head restraint having a pair of armatures guided by a pair of head restraint guide bushings according to one embodiment of the invention.

Referring to FIG. 1, a typical automotive vehicle seat is generally shown at 10. The seat 10 includes a seat cushion 12, a seat back 14, and a head restraint 16 operatively coupled to an upper end 18 of the seat back 14. The head restraint 16 is attached in a known manner to at least one, and in the current embodiment, to a pair of spaced apart and parallel rods or armatures 20, 22.

Figure 2:
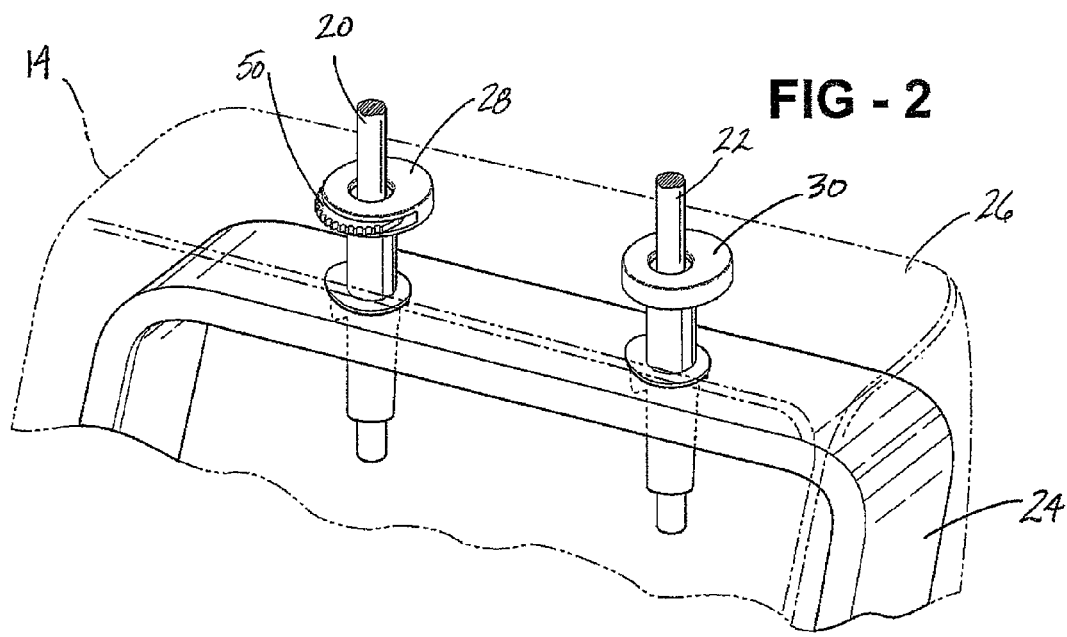
FIG. 2 is a fragmentary, perspective view of a seat back frame including the pair of head restraint guide bushings and the pair of armatures.

Referring to FIG. 2, the construction of the seat back 14 comprises a rigid seat back frame 24 for supporting a contoured foam pad (not shown) encased by a trim cover 26 as conventionally known to one skilled in the art. A pair of plastic head restraint guide bushings 28, 30 is inserted into openings (not shown) in the seat back frame 24 and each armature 20, 22 is slidably mounted in one of the guide bushings 28, 30. In this manner, the head restraint 16 is vertically adjustable relative to the seat back 14 and can also be completely removed or detached from the seat back 14.

Referring to FIGS. 4 and 5, at least one of the armatures 20 includes a plurality of adjustment notches 32 spaced equidistantly in a vertical direction along a first side 34 of the armature 20. On a second side 36 of the armature 20, generally opposite the first side 34, a stop notch 38 is formed below or at the same level as the lowest adjustment notch 32. In the embodiment shown, the stop notch 38 coincides with the lowest adjustment notch 32. It is contemplated that both armatures 20, 22 may include the plurality of adjustment notches 32 and the stop notch 38 without varying from the scope of the invention.

The guide bushing 28 corresponding to the armature 20 with the plurality of adjustment notches 32 and the stop notch 38 will be described in detail hereinafter. The guide bushing 30 corresponding to the armature 22 can be any standard guide bushing known to one skilled in the art. Referring to FIGS. 3, and 6 through 8, the guide bushing 28 includes an elongated cylindrical stem 40 having an axial bore 42 for receiving the armature 20 therein and an enlarged head 44 extending in a plane transverse to the axial bore 42. The guide bushing 28 is preferably molded in one piece of a suitable thermoplastic and is adapted to be seated and locked in engagement with the seat back frame 24. An annular flange 46 on the stem 40 is generally parallel to the head 44 and serves as an abutment stop, engaging a top side of the seat back frame 24 when the guide bushing 28 is fully inserted therein. The head 44 of the guide bushing 28 is provided to cover an access hole (not shown) in the trim cover 26. In the embodiment shown, the head 44 and annular flange 46 are spaced apart a distance corresponding to the thickness of the foam pad. Alternatively, the guide bushing 28 can be molded without the annular flange 46, and in such case, the bottom surface of the head 44 will serve as the abutment stop against the trim cover 26.

Figure 6:
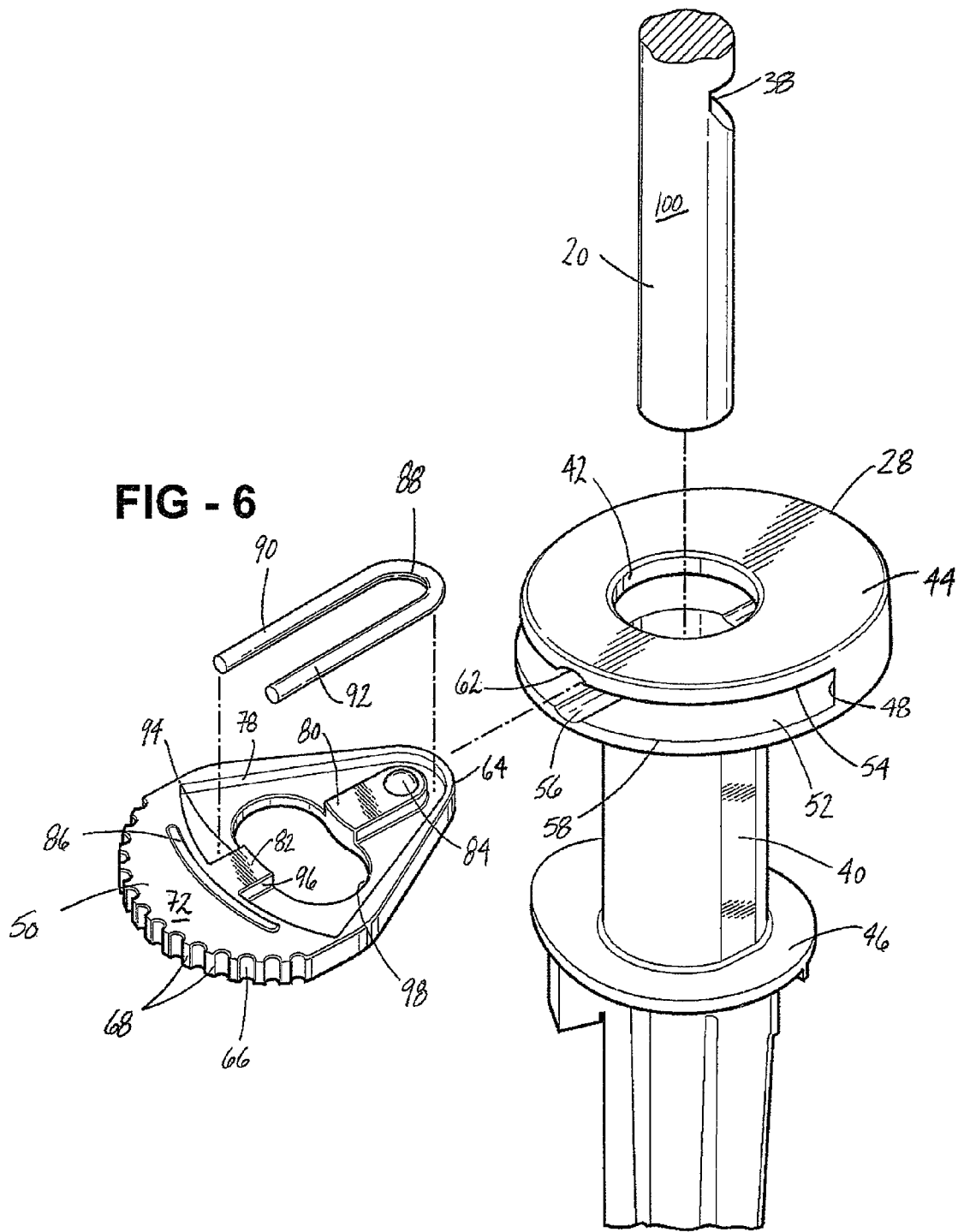
FIG. 6 is an exploded, perspective view of the head restraint guide bushing and the armature in FIG. 3.
Figure 7:
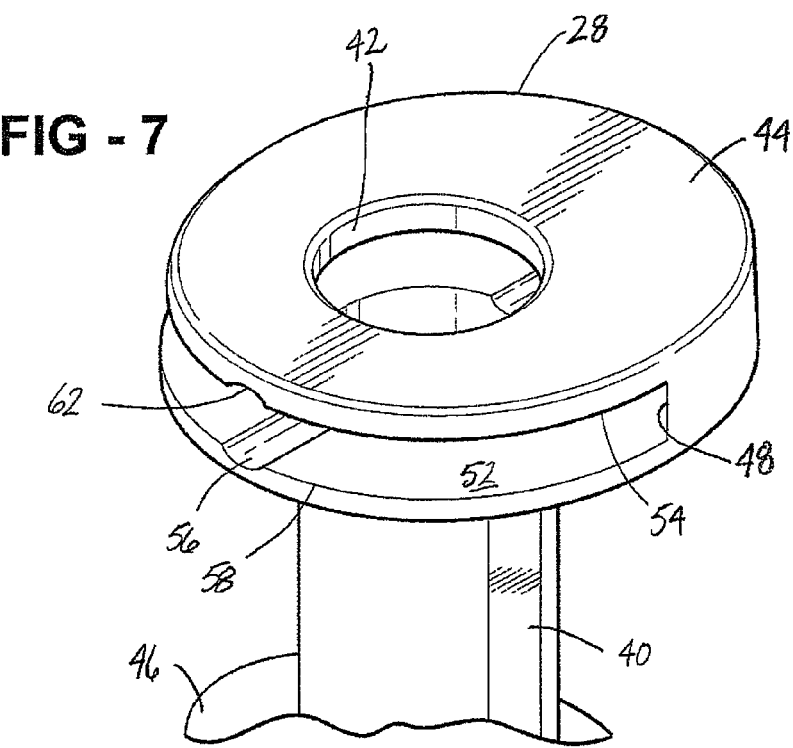
FIG. 7 is a fragmentary, top perspective view of the head restraint guide bushing in FIG. 3.
Figure 8:
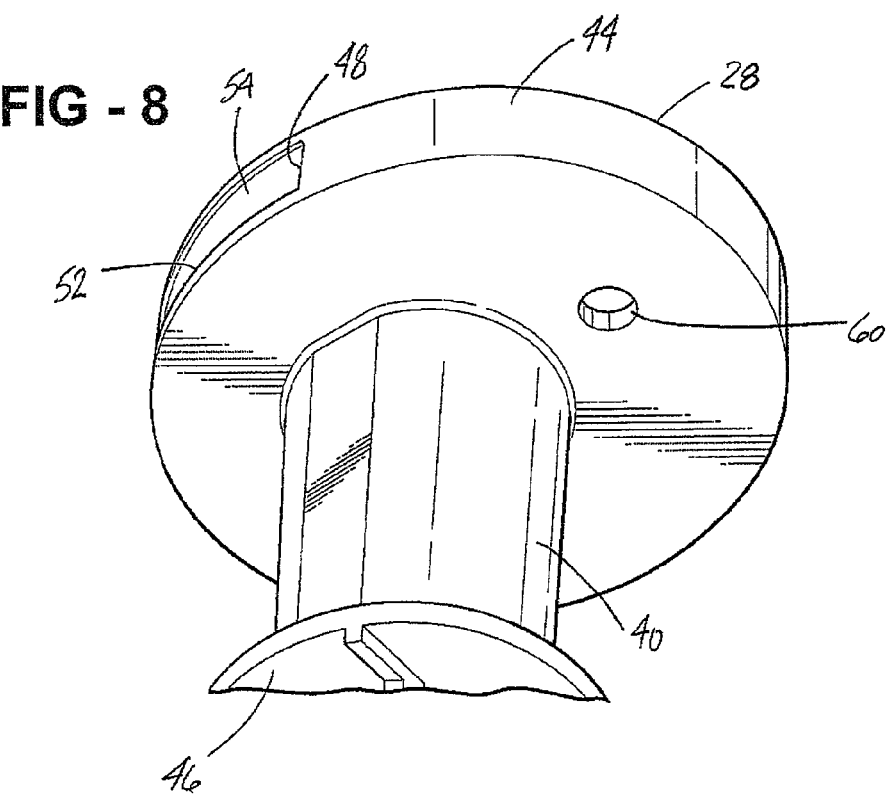
FIG. 8 is a fragmentary, bottom perspective view of the head restraint guide bushing in FIG. 3.

The head 44 of the guide bushing 28 includes an open receptacle 48 for receiving a two-way locking lever 50 therein. The open receptacle 48 is defined by a lower surface 52 and an opposing upper surface 54. The axial bore 42 extends through the lower and upper surfaces 52, 54. A first channel 56, shown in FIGS. 6 and 7, is formed in the lower surface 52 and extends from a mouth 58 of the open receptacle 48 to a lever pivot hole 60, shown in FIG. 8, on the opposite side of the axial bore 42. The first channel 56 bisects the lower surface 52. A second channel 62, shown in FIGS. 3, 6, and 7, is formed in the upper surface 54 in facing relation to the first channel 56 and extends from the mouth 58 of the open receptacle 48 to an end location directly above the lever pivot hole 60. The purpose of the first and second channels 56, 62 will become apparent below.

Figure 9:
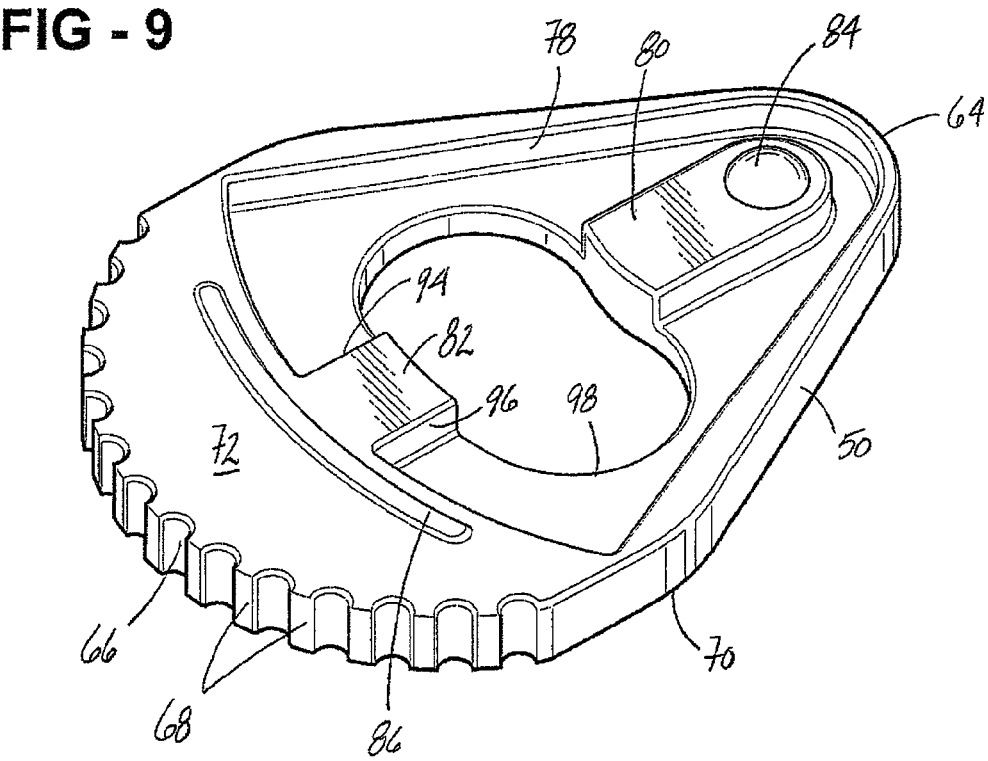
FIG. 9 is a top perspective view of a two-way locking lever.
Figure 10:
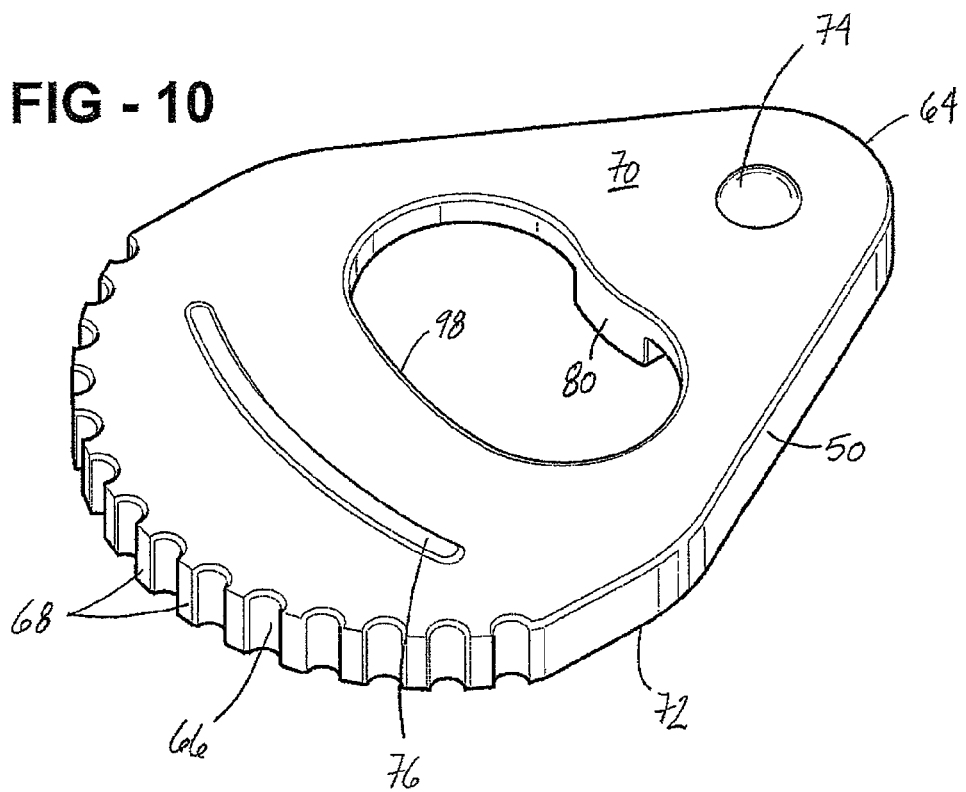
FIG. 10 is a bottom perspective view of the two-way locking lever.

Referring to FIGS. 9 and 10, the two-way locking lever 50 is generally triangular-shaped and extends between an inner tip 64 and an outer peripheral edge 66. It is appreciated, however, that the locking lever 50 may be any shape without varying from the scope of the invention. The outer peripheral edge 66 is generally convex and includes a plurality of teeth or a knurled surface 68 for providing grip, the reason for which will become apparent below. The locking lever 50 includes a bottom surface 70 and an opposite top surface 72. The bottom surface 70 is generally smooth except for a lower pivot 74 protruding therefrom adjacent the inner tip 64 and a lower arcuate stability rib 76 protruding therefrom adjacent the outer peripheral edge 66. The top surface 72 has a triangular-shaped cavity 78 bisected by a first raised portion 80 and a second raised portion 82. An upper pivot 84 protrudes from the first raised portion 80 adjacent the inner tip 64 and an upper arcuate stability rib 86 protrudes from the top surface 72 adjacent the outer peripheral edge 66. The cavity 78 is adapted to receive a generally U-shaped spring wire 88, as shown in FIGS. 6, and 11 through 14. The spring wire 88 includes a first leg 90 and a second leg 92. The closed end of the spring wire 88 is disposed about the first raised portion 80 and the ends of the first and second legs 90, 92 are adjacent to first and second sides 94, 96 of the second raised portion 82, respectively. The locking lever 50 also includes an aperture 98 extending therethrough between the first and second raised portions 80, 82.

The locking lever 50 is disposed within the open receptacle 48 of the head 44 of the guide bushing 28 such that the knurled surface 68 of the outer peripheral edge 66 protrudes at least partially from the mouth 58. More specifically, the lower pivot 74 protruding from the bottom surface 70 of the locking lever 50 is disposed in the lever pivot hole 60 and the upper pivot 84 protruding from the top surface 72 of the locking lever 50 is disposed at the end location of the second channel 62 directly above the lever pivot hole 60, thereby pivotally coupling the locking lever 50 within the head 44 of the guide bushing 28. It is appreciated that the first and second channels 56, 62 formed in the respective lower and upper surfaces 52, 54 provide clearance for the lower and upper pivots 74, 84 to allow the locking lever 50 to be assembled into the open receptacle 48.

The aperture 98 extending through the locking lever 50 is aligned with the axial bore 42 of the guide bushing 28 when the locking lever 50 is pivotally coupled within the head 44 of the guide bushing 28 such that the armature 20 extends therethrough and is disposed between the first and second legs 90, 92 of the spring wire 88. The width of the first and second raised portions 80, 82 within the cavity 78 of the locking lever 50 is less than the diameter of the armature 20 such that the first and second legs 90, 92 of the spring wire 88 are biased against an outer surface 100 of the armature 20.

As best seen in FIG. 4, when the head restraint 16 is in use, the first leg 90 of the spring wire 88 engages one of the adjustment notches 32 and the second leg 92 engages the outer surface 100 of the armature 20 opposite the adjustment notch 32 being engaged. The result of this engagement is the armature 20, and thus the head restraint 16, is locked in place. With the first leg 90 engaging one of the adjustment notches 32 and the second leg 92 engaging the outer surface 100 of the armature 20, the locking lever 50 is in a first locking position, as shown in FIG. 11. The adjustment notches 32 are designed to have a wedge fit with the first leg 90 of the spring wire 88 to ensure that there is no vertical looseness of the head restraint 16.

In order to adjust the vertical position of the head restraint 16, the locking lever 50 is actuated to an adjustment position, shown in FIG. 12, by pushing on the knurled surface 68 to pivot the locking lever 50 in a clockwise direction (when viewed from FIG. 12). As the locking lever 50 pivots in the clockwise direction, the first side 94 of the second raised portion 82 pushes the first leg 90 of the spring wire 88 outward relative to the armature 20 to disengage the first leg 90 from the adjustment notch 32. It is now possible to slide the armature 20 within the guide bushing 28, thus permitting the height of the head restraint 16 to be adjusted up or down. Additionally, as the locking lever 50 pivots between the first locking position and the adjustment position, the lower and upper arcuate stability ribs 76, 86 slidably contact the lower and upper surfaces 52, 54 of the open receptacle 48 to guide and support the locking lever 50 therewithin.

Referring to FIGS. 4 and 5, each one of the plurality of adjustment notches 32 include an upper edge 102 and a lower edge 104. The upper edge 102 is at an approximately ninety (90) degree angle to the outer surface 100 of the armature 20 so that once the head restraint 16 is positioned with the first leg 90 of the spring wire 88 engaging one of the adjustment notches 32, the application of a sudden force or impact will not cause the head restraint 16 to move in a downward direction. In other words, the first leg 90 engages against the upper edge 102 of the adjustment notch 32 and blocks the head restraint 16 from being lowered. The lower edge 104 is at some angle less than ninety (90) degrees to the outer surface 100 of the armature 20 so that the head restraint 16 can be raised without actuating the locking lever 50 to the adjustment position. The head restraint 16 can be raised until the second leg 92 of the spring wire 88 engages the stop notch 38.

As best seen in FIG. 5, in order to remove the head restraint 16 from the seat back 14, the armature 20 is moved upwards until the second leg 92 of the spring wire 88 engages the stop notch 38 and the first leg 90 of the spring wire 88 engages the lowest adjustment notch 32. The result of this engagement is the armature 20, and thus the head restraint 16, is once again locked in place. With the second leg 92 engaging the stop notch 38 and the first leg 90 engaging the lowest adjustment notch 32, the locking lever 50 is in a second locking position, as shown in FIG. 13. In order to remove the head restraint 16, the locking lever 50 is actuated to a removal position, shown in FIG. 14, by pushing on the knurled surface 68 to pivot the locking lever 50 in a counterclockwise direction (when viewed from FIG. 14). As the locking lever 50 pivots in the counterclockwise direction, the second side 96 of the second raised portion 82 pushes the second leg 92 of the spring wire 88 outward relative to the armature 20 to disengage the second leg 92 from the stop notch 38. It is now possible to slide the armature 20 farther upwards and out of the guide bushing 28, thus permitting the head restraint 16 to be removed.

The stop notch 38 includes an upper edge 106 and a lower edge 108. The lower edge 108 is at an approximately ninety (90) degree angle to the outer surface 100 of the armature 20 so that once the head restraint 16 is positioned with the second leg 92 of the spring wire 88 engaging the stop notch 38, removal of the armature 20 is prevented. In other words, the second leg 92 engages against the lower edge 108 of the stop notch 38 and blocks the head restraint 16 from being removed. The upper edge 106 is at some angle less than ninety (90) degrees to the outer surface 100 of the armature 20 so that the head restraint 16 can be lowered back down until the first leg 90 of the spring wire 88 engages the upper edge 102 of the lowest adjustment notch 32.

In the embodiment shown, because the stop notch 38 coincides with the lowest adjustment notch 32, when the second leg 92 engages the lower edge 108 of the stop notch 38 the first leg 90 engages the upper edge 102 of the lowest adjustment notch 32 and therefore further raising and lowering of the head restraint 16 is prevented. Thus, in order to raise the head restraint 16 from this position to remove the head restraint 16 from the seat back 14, it is necessary to pivot the locking lever 50 in the clockwise direction to the removal position. Alternatively, in order to lower the head restraint 16 from this position, it is necessary to pivot the locking lever 50 in the counterclockwise direction to the adjustment position.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed:

1. A head restraint guide for guiding and engaging a head restraint armature, the armature having a plurality of adjustment notches on a first side and a stop notch on an opposite second side, said head restraint guide comprising:
   a guide bushing having an axial bore for receiving the armature therein;
   a lever pivotally coupled to said guide bushing; and
   a spring including first and second portions biased against the armature, said first portion adapted for engaging any of the plurality of adjustment notches and said second portion adapted for engaging the stop notch;
   wherein pivoting said lever in a first direction disengages said first portion of said spring from the plurality of adjustment notches allowing axial adjustment of the armature relative to said guide bushing and pivoting said lever in a second direction disengages said second portion of said spring from the stop notch allowing removal of the armature from said guide bushing.

2. A head restraint guide as set forth in claim 1 wherein said lever includes a first side for engaging and urging said first portion of said spring from the plurality of adjustment notches and a second side for engaging and urging said second portion of said spring from the stop notch.

3. A head restraint guide as set forth in claim 2 wherein said guide bushing includes a head extending in a plane transverse to said axial bore, said head having an open receptacle for pivotally receiving said lever therein, and wherein said axial bore extends through said head.

4. A head restraint guide as set forth in claim 3 wherein said lever includes an aperture for receiving the armature therethrough.

5. A head restraint guide as set forth in claim 4 wherein said open receptacle includes a mouth and said lever protrudes at least partially from said mouth.

6. A head restraint guide as set forth in claim 5 wherein said lever extends between a tip pivotally coupled within said open receptacle and a peripheral edge protruding at least partially from said mouth.

7. A head restraint guide as set forth in claim 6 wherein said tip and said peripheral edge of said lever are disposed on generally opposite sides of the armature.

8. A head restraint guide as set forth in claim 7 wherein said lever is generally triangular-shaped extending between said tip and said peripheral edge.

9. A head restraint guide as set forth in claim 8 wherein said spring is generally U-shaped and said first portion is disposed on the first side of the armature and said second portion is disposed on the second side of the armature.

10. A head restraint guide as set forth in claim 9 wherein said lever includes a raised portion disposed between said first and second portions of said spring, and said raised portion defines said first and second sides of said lever.

11. A head restraint guide as set forth in claim 10 wherein said lever includes a bottom surface having a lower pivot adjacent said tip and said upper surface has an upper pivot adjacent said tip and opposite said lower pivot, wherein said lower and upper pivots pivotally couple said lever within said open receptacle.

12. A head restraint guide as set forth in claim 11 wherein said lever includes an upper arcuate rib protruding from said upper surface adjacent said peripheral edge and a lower arcuate rib protruding from said lower surface adjacent said peripheral edge, wherein said upper and lower arcuate ribs are provided for guiding and supporting pivotal movement of said lever within said open receptacle.

13. A head restraint guide as set forth in claim 12 wherein said open receptacle is defined by a lower surface and an opposing upper surface, wherein said axial bore extends through said lower and upper surfaces.

14. A head restraint guide as set forth in claim 13 wherein said lower surface is bisected by a first channel extending between said mouth of said open receptacle and a hole adapted for receiving said lower pivot of said lever and said upper surface is bisected by a second channel extending between said mouth of said open receptacle and an end above said hole adapted for receiving said upper pivot of said lever.

15. A head restraint guide as set forth in claim 14 wherein said upper surface of said lever includes a triangular-shaped cavity for receiving said spring therein.

16. A vehicle seat comprising:
a seat back;
a head restraint including at least one armature having a plurality of adjustment notches on a first side and a stop notch on a second side;
at least one guide bushing coupled to said seat back, said guide bushing including an axial bore for receiving said armature therein;
a lever pivotally coupled to said guide bushing, said lever including an aperture for receiving said armature therethrough; and
a spring including first and second portions biased against said armature, said first portion adapted for engaging any one of said plurality of adjustment notches to lock said head restraint in place and said second portion adapted for engaging said stop notch to prevent removal of said head restraint from said seat back;
wherein pivoting said lever in a first direction disengages said first portion from said plurality of adjustment notches allowing axial adjustment of said head restraint relative to said seat back and pivoting said lever in a second direction disengages said second portion from said stop notch allowing removal of said head restraint.

17. A vehicle seat as set forth in claim 16 wherein said spring is generally U-shaped and said first portion is disposed on said first side of said armature and said second portion is disposed on said second side of said armature.

18. A vehicle seat as set forth in claim 17 wherein each of said plurality of adjustment notches includes an upper edge at an approximately ninety degree angle to said first side of said armature and a lower edge at an angle less than ninety degrees to said first side of said armature.

19. A vehicle seat set as forth in claim 18 wherein said stop notch includes a lower edge at an approximately ninety degree angle to said second side of said armature and an upper edge at an angle less than ninety degrees to said second side of said armature.

* * * * *